M. C. WERTZLER.
ATTACHMENT FOR AUTOMOBILES.
APPLICATION FILED FEB. 2, 1918.

1,320,517.

Patented Nov. 4, 1919.
2 SHEETS—SHEET 1.

INVENTOR
Mathias C. Wertzler

WITNESSES

BY
ATTORNEYS

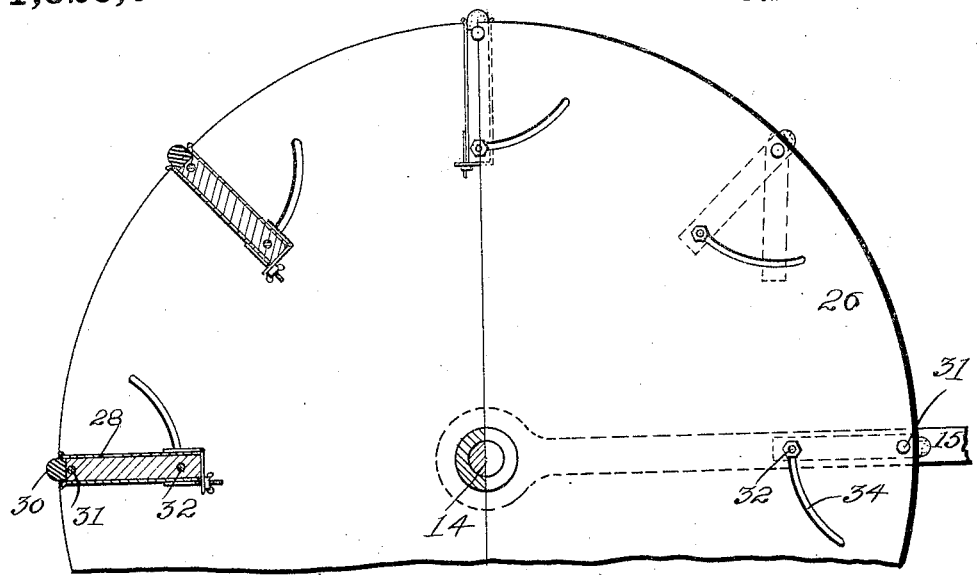
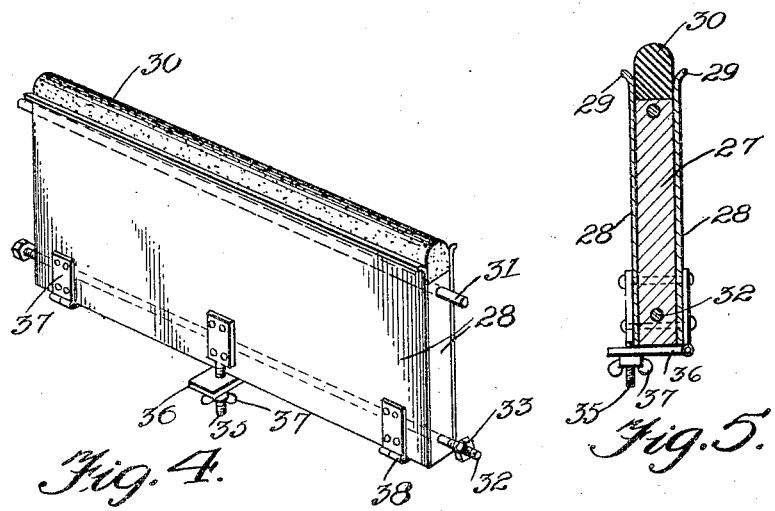

UNITED STATES PATENT OFFICE.

MATHIAS CORNELIUS WERTZLER, OF HAILEY, IDAHO.

ATTACHMENT FOR AUTOMOBILES.

1,320,517.  Specification of Letters Patent.  Patented Nov. 4, 1919.

Application filed February 2, 1918. Serial No. 215,030.

*To all whom it may concern:*

Be it known that I, MATHIAS C. WERTZLER, a citizen of the United States, and a resident of Hailey, in the county of Blaine and State of Idaho, have invented new and useful Improvements in Attachments for Automobiles, of which the following is a specification.

My invention is an improvement in attachments for automobiles, and has for its object to provide an attachment of the character specified, to permit the automobile to run on snow, wherein runners are provided upon which the frame of the automobile is mounted, and wherein driving wheels are arranged at the rear of the frame and connected to the motor to cause the same to drive the driving wheels to propel the vehicle forwardly.

In the drawings:

Fig. 3 is an enlarged side view of the driving wheel, with parts in section;

Fig. 4 is a perspective view of one of the driving blades;

Fig. 5 is a central transverse section of the said blade.

Figure 1:
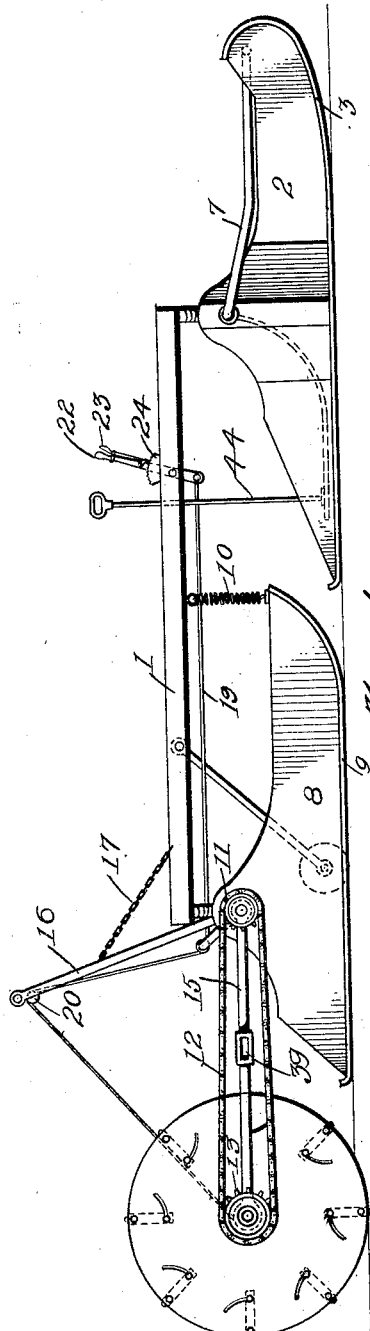
Figure 1 is a side view of the improved attachment.
Figure 2:
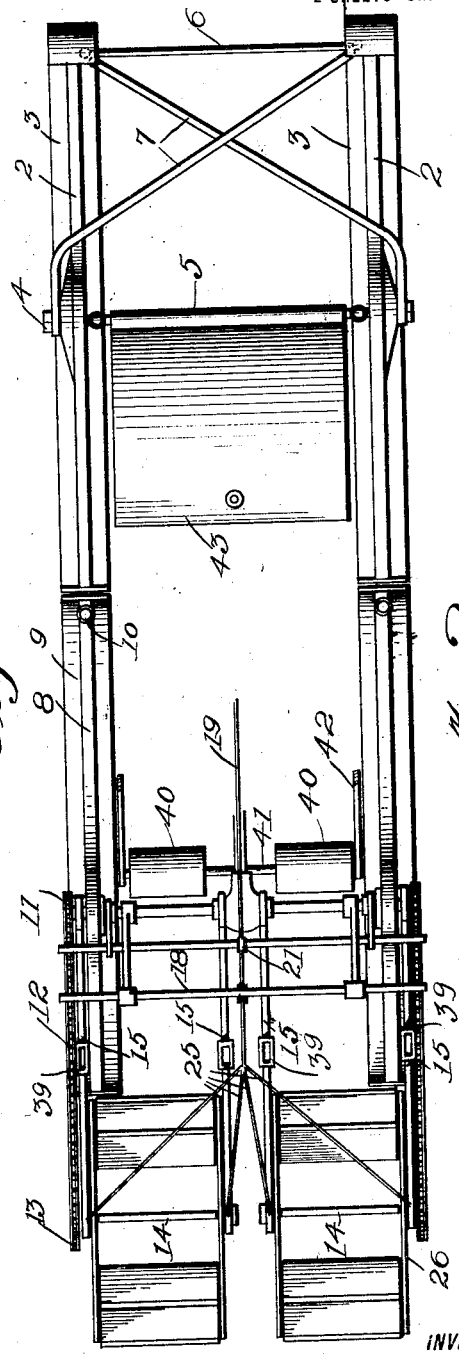
Fig. 2 is a top plan view.

The present embodiment of the invention is shown in connection with the frame 1 of a motor vehicle, the runners taking the place of the wheels and being connected to the front and rear axles. The front runners each consists of a body 2 of suitable shape and which may be of wood, and a reinforcing or facing strip 3 of metal forming a shoe for the runner. These runners 2—3 are mounted on the spindles 4 of the front axle 5, and the runners 2—3 are connected at their front ends by a cross rod 6. Brace rods 7 are connected with the front ends of the runners and with the opposite spindles, in the manner shown more particularly in Fig. 1, and the vehicle is steered in the usual manner by swinging the front ends of the front runners. Other runners 8 are connected with the rear axle, the said runners being mounted on the spindles, and each runner is provided with a reinforcing facing or shoe 9.

Coil springs 10 are arranged between the frame and the front ends of the runners 8—9, and sprocket wheels 11 are arranged on the ends of the rear axle. These sprocket wheels are connected by sprocket chains 12 with sprocket wheels 13 on the shafts 14 of the driving wheels, two of the said wheels being provided, which are arranged in alinement in the manner shown. The shafts 14 are mounted on radius or spacing rods 15, which, at their forward ends, are journaled on the axle housing, and mechanism is provided for permitting the shafts and wheels to be lifted. The said mechanism comprises a pair of standards 16 mounted on the axle housing which are braced by chains 17 against the frame, and are connected by a rod 18 at their upper ends.

A cable 19 is connected with the rear ends of the radius rods 15 in a manner to be presently described, and the said cable passes upwardly over a direction element or pulley 20 supported by the cross rod 18 of the standards, and downwardly beneath another direction element 21 on the frame and forwardly to an adjusting lever 22 which is pivoted on the frame and has latch mechanism 23 coöperating with a toothed quadrant 24 on the frame. The rear end of the cable 19 is connected to the rear ends of the radius rods 15 by means of branch cables 25, and it will be evident that when the lever is moved in the proper direction the driving wheels will be raised or lowered. Each of the said wheels consists of the shaft 14, a pair of spaced disks 26 secured to the shaft and a series of driving blades, to be described, arranged between the disks. Each of these blades consists of a body portion 27 and facing plates 28 which, at their outer edges, are curved outwardly, as shown at 29, and a strip 30 of rubber or the like is arranged between the outer edges of the facing plates, the said plates extending beyond the outer edge of the body 27, as shown in Fig. 5.

Rods 31 and 32 are passed longitudinally of the body near the opposite edges thereof, and by means of the rod 31 each blade is pivoted between the disks near the peripheral edges of the said disks. The ends of the rod 32 extend through arc shaped slots 34 in the disks, and these slots are so arranged that the blades may be adjusted outwardly and inwardly by swinging the rod 32 in the slots. The ends of the rod outside of the disk are engaged by nuts 33 to hold the blade in adjusted position, and the facing plates 28 are connected at their inner edges by the mechanism shown in Figs. 4 and 5. The said mechanism comprises a central and end connections. Each connection consists of a stem 35 secured to one leaf and a hinge 36 secured to the other, one of the leaves being connected to the other facing plate and the other leaf having an opening for receiving the stem 31. A wing nut 37 is threaded on to the stem to hold the parts together. The wing nuts in the end connections are at the opposite sides of the blades from the wing nuts of the central connection. The tread portion 30 of each blade extends beyond the peripheral edges of the disk 26, and it will be obvious that the angle of the blades may be varied by loosening the nuts 33 and swinging the inner ends of the blades. The slots 34 have the rods 31 as their centers.

Turn buckles 39 are interposed in the length of the radius rods 15, to permit the sprocket chains 12 to be tightened. These turn buckles are of usual construction, consisting of a double nut which engages the threaded ends of the sections of the rod. A pair of rollers 40 is arranged between the rear runners 8—9, the said rollers being mounted on a shaft 41 which is journaled at its ends in supporting arms 42 pivoted at their upper ends on the frame. A weight controlling shoe 43 is arranged between the front runners, the said shoe being mounted at its front end on the front axle, and a controlling link 44 is connected with the shoe, the said link having at its upper end a grip for convenience in operating the same.

In use, the driving wheels drive the vehicle, obtaining their power from the rear axle, and by means of the lever 22 they may be adjusted to suit conditions.

The rollers serve to pack the snow so that the propelling wheels have a better engaging surface. The shoe 43 also serves the same purpose and in addition assists in taking the weight off the front runners.

I claim:

1. Mechanism of the character specified comprising runners adapted for connection with the spindles of the axles of a motor vehicle, and drive wheels arranged in rear of the vehicle and having a driving connection with the rear axle, said wheels being mounted to swing on the frame, and means for raising and lowering the said wheels, each wheel comprising a shaft, radius rods journaled on the frame at one end and supporting the shaft at the other, a pair of disks secured to each shaft near the ends thereof, blades having a tread extending beyond the peripheries of the disks, and means for varying the angle of the blade with respect to the shaft.

2. A driving mechanism for a motor sled, comprising a shaft, wheels journaled on the shaft, radius rods journaled on the axle, the shaft being journaled in the opposite ends of the radius rods, means for raising and lowering the outer ends of the shaft to bring the propelling wheels into and out of engaging position, each of the wheels comprising a pair of disks spaced apart from each other, blades each having a plate extending beyond the periphery of the disks, and means for varying the angles of the blades.

MATHIAS CORNELIUS WERTZLER.

Witnesses:
ARTHUR JAMES STEARNS,
CHARLES LESLIE REYNOLDS.